Sept. 3, 1929.   A. H. HAMRE   1,727,286

DEVICE FOR PICKING FRUIT

Filed June 12, 1928

WITNESSES
W. S. Martin

INVENTOR
A. H. HAMRE
BY Munn & Co.
ATTORNEY

Patented Sept. 3, 1929.

1,727,286

UNITED STATES PATENT OFFICE.

ALLIE H. HAMRE, OF SEDROWOOLLEY, WASHINGTON.

DEVICE FOR PICKING FRUIT.

Application filed June 12, 1928. Serial No. 284,707.

The invention relates to a device for picking fruit.

The object of the invention is to provide a simple and efficient one-piece device to be grasped easily by the fingers while picking and cutting fruit, vegetables and the like, and to receive blades of various kinds to adapt the device to a variety of work.

In picking fruit, speed, ease of operation and adaptability to various uses are vital requisites of the picking tool. It must be cheap, light in weight and so much part of the hand of the user as not to be in the way to any appreciable extent.

To that end the invention comprises a single-piece, light-weight device having a blade-receiving portion with resilient means thereon to grip a blade in position for cutting, and with a dependent finger-receiving portion so that as the fingers move, the fruit can be cut without disturbing the rest of the hand which may be engaged in holding a container for the fruit which drops from the cutting tool directly into the container.

Preferably the blade gripping means is so related to the body of the device as to in part form a groove to receive a similarly shaped tongue on the various blades used with the device. The blades are preferably provided with tongues, and the cutting edge or surface thereof is curved so as to tend to hold the stems of the fruit or a part of the object being cut in and toward the center of the blade so that it will not slip out of cutting range.

The preferred form of the invention is illustrated in the drawings of which—

Figure 1:
Figure 1 is a perspective view of the device attached to the fingers of a cherry picker, to the hand of which is fastened by any suitable means a container into which the cherries are dropped as they are picked or cut.
Figure 2:
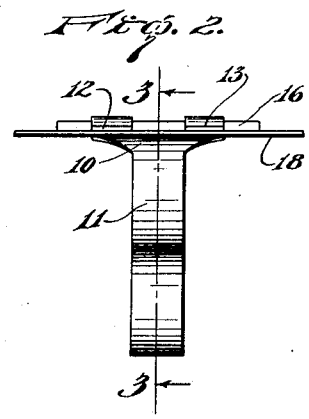
Figure 2 is a front elevation of the device as viewed by the picker.
Figure 3:
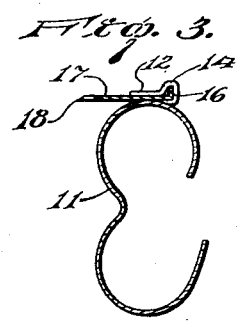
Figure 3 is a transverse vertical section taken on the line 3—3 of Figure 2.

In the form of the invention illustrated the picking or cutting device comprises a blade-receiving portion or plate 10 which may also be called a seat. Depending from one end of this plate 10 is a curved finger-receiving portion or strip 11. This strip is curved to lie snugly against the fingers, especially the first and second fingers of the hand and to curve around them in a fairly snug manner so that as the fingers are together moved backward and forward the knife carried by the device can be rubbed or drawn against the stems or surfaces of the material to be cut.

The blade-receiving portion or plate 10 is provided with spring fingers 12 and 13 which are spaced from each other and from the surface of the plate 10 a definite distance. These fingers extend forwardly over the plate 10. At the rear of the fingers they are spaced or curved further away from the plate 10 to form grooves 14 and 15 larger in dimension than the normal space between the fingers and the plate 10. These grooves are adapted to receive a tongue 16 formed along one edge of the blade 17 so that as the blade is slipped laterally between the plate 10 and the fingers 12 and 13 the tongue 16 will ride in the grooves 14 and 15 to hold the blade in position.

Figure 4:
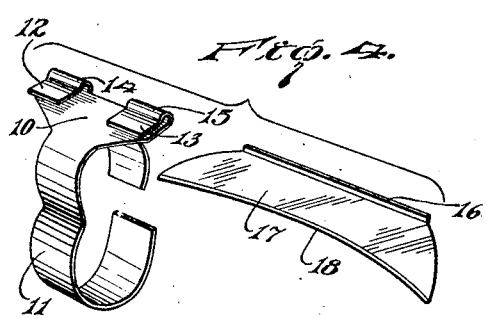
Figure 4 is a perspective view of a plate side-by-side with the frame for holding the blade, indicating the manner in which they are constructed to resiliently engage each other.

In the form of blade shown in Figure 4 the cutting edge 18 is along the front of the blade and is curved concavely in the plane of the blade so that as it is advanced toward the stems of cherries, for instance, the stems will tend to be kept toward the center of the blade and not slip off. This curvature will also tend to cause the stems to slide sideways toward the center and thus effect a sort of shearing or cutting action.

Figure 5:
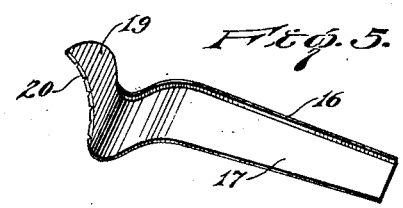
Figure 5 is a perspective view of a modified form of plate.

In Figure 5 the cutting edge of the blade 17 is along the front edge but this portion is bent up at one end of the blade, as shown by the numeral 19, so that the cutting edge, which is also curved at 20, is disposed at right angles to the plane of the main portion of the blade. This sort of blade would be adaptable for cutting the stems of such material as may happen to extend in a horizontal direction.

Figure 6:
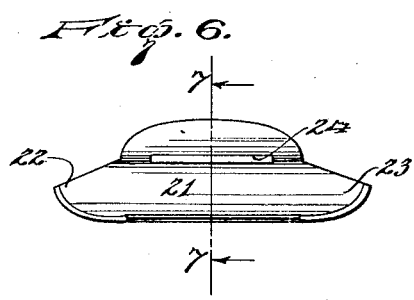
Figure 6 is a still further modification of a blade to be used with the holder shown in Figure 4 and especially adaptable for paring or peeling potatoes.
Figure 7:
Figure 7 is a transverse section taken on the line 7—7 of Figure 6.

In Figures 6 and 7 a tool or blade for paring or peeling potatoes is provided with a tongue 16, but the front portion of the blade is bent up, as at 21, to come in contact with the potato. The ends 22 and 23 of this front portion are curved to produce a similar effect as above noted, namely, to keep the potato toward the center of the device. The cutting edge 24 is shown at the top of the front surface.

It is apparent, therefore, that even without taking the holder or finger grip off his hand, the holder can remove the blade and quickly insert a new one adapted for any particular use. The entire device is light weight, simple in construction, and cheap to manufacture. It is not bulky or cumbersome and is in the way of the holder to a minimum extent.

What I claim is:—

A cutting device comprising a blade-receiving portion, resilient fingers thereon connected to the back edge of said portion and extending forward to slidably receive a blade therebetween, a portion of said fingers shaped to form an enlarged groove, a blade disposed beneath said fingers, and a tongue on said blade to lie in said groove, and a finger-engaging portion depending from the front edge of the blade-receiving portion.

Signed at Sedro-Woolley in the county of Skagit and State of Washington this 24th day of May A. D. 1928.

ALLIE H. HAMRE.